US006594135B1

(12) United States Patent
Ervasti

(10) Patent No.: US 6,594,135 B1
(45) Date of Patent: Jul. 15, 2003

(54) FILTER

(75) Inventor: Kimmo Ervasti, Oulunsalo (FI)

(73) Assignee: Remec Oy, Oulu (FI)

( * ) Notice: Subject to any disclaimer, the term of this patent is extended or adjusted under 35 U.S.C. 154(b) by 0 days.

(21) Appl. No.: 10/009,883

(22) PCT Filed: May 18, 2000

(86) PCT No.: PCT/FI00/00447

§ 371 (c)(1),
(2), (4) Date: Mar. 13, 2002

(87) PCT Pub. No.: WO00/72402

PCT Pub. Date: Nov. 30, 2000

(30) Foreign Application Priority Data

May 19, 1999 (FI) .................................................. 991145

(51) Int. Cl.[7] ................................................ H01G 4/228
(52) U.S. Cl. .................. 361/306.1; 361/302; 361/321.2
(58) Field of Search ...................... 361/306.1, 311–312, 361/321.2, 302; 333/182, 183, 184, 185, 186, 191

(56) References Cited

U.S. PATENT DOCUMENTS 5,666,093 A 9/1997 D'Ostilio .................... 333/307

FOREIGN PATENT DOCUMENTS

| | | |
|---|---|---|
| EP | 0694983 | 1/1996 |
| EP | 0788182 | 8/1997 |
| FI | 87406 | 9/1992 |
| JP | 4007902 | 1/1992 |
| JP | 6196903 | 7/1994 |
| JP | 11205008 | * 7/1999 |
| WO | 8302853 | 8/1983 |

OTHER PUBLICATIONS

Patent Abstracts of Japan of JP 11205008 Dated Jul. 30, 1999.

Patent Abstracts of Japan of JP 4007902 Dated Jan. 13, 1992.

Patent Abstracts of Japan of JP 6196903 Dated Jul. 15, 1994.

* cited by examiner

*Primary Examiner*—Anthony Dinkins
(74) *Attorney, Agent, or Firm*—Ladas & Parry

(57) ABSTRACT

The invention relates to a high-frequency filter comprising a block-like housing (2) made of a dielectric material, the housing comprising ends (3, 4) and side surfaces (11–14), the section between the ends being provided with a conductive plating (5) acting as the filter's outer conductor (5). In addition, the filter comprises at least two holes (21–25) extending on the section between the ends of the block-like housing, the holes being plated with a conductive plating to provide two inner conductors (21–25). The filter further comprises a connection base (31) provided with a conductive pattern (30), the block-like housing being arranged onto the base, and the conductive pattern (30) of the filter comprising connecting areas (41–45) for connecting the inner conductors (21–25) onto the connection base (30). According to the idea of the invention, the filter, which is connected to the conductive pattern (30) of the connection base (31), the connection base (31) being outside the conductive plating (5) acting as the filter's outer conductor (5) and arranged on the surface of its block-like housing (2), comprises one or more coupling members (110, 120, 130, 140, 150) for setting capacitive couplings between the inner conductors.

19 Claims, 4 Drawing Sheets

B

C

G

FILTER

BACKGROUND OF THE INVENTION

The invention relates to a high-frequency filter comprising a block-like housing made of a dielectric material, the housing comprising ends and side surfaces, the section formed on the side surfaces between the ends being provided with a conductive plating acting as the filter's outer conductor, at least two holes plated with a conductive material and located on the section extending between the ends of the block-like housing to allow at least two inner conductors to be provided;

a connection base provided with a conductive pattern, the block-like housing being arranged onto the base;

and the conductive pattern of the filter comprising connection areas for coupling the inner conductors to the connection base.

The invention relates particularly to making capacitive couplings in a filter having a block-like housing made of a ceramic or other kind of dielectric material.

High-frequency filters, such as radio frequency filters, for example resonator filters, are used for providing high-frequency circuits for example at base stations, mobile stations and other radio transceivers used in mobile communications networks. One possibility is to use radio frequency filters for example as interface circuits and filtering circuits in the amplifiers of base station transmitter units or receiver units.

One of the filter types is a filter which has a block-like housing made of a ceramic or other kind of dielectric material, the sides of the block-like housing being provided with a plating made of a conductive material and the block being provided with holes having a conductive plating which acts as the inner conductor of the filter, the above mentioned conductive plating on the side surfaces of the block acting as the filter's outer conductor.

Capacitive couplings are made between the inner conductors and ground potential of a filter. They are implemented by arranging a suitable amount of capacitance between the inner conductors and the ground plane, the capacitance having an effect on resonance frequency. The frequency control of each resonance circuit of the filter is based on the fact that by increasing the capacitance, i.e. by strengthening the capacitive coupling, between a free end of the resonator inner conductor and the ground potential, where the outer connector is, the resonance frequency of the resonance circuit decreases, whereas by decreasing the capacitance, i.e. by weakening the capacitive coupling, the resonance frequency increases.

Capacitive couplings are also made between the inner conductors of two resonance circuits of a filter. This usually takes place through a conductive material arranged in the area between the inner conductors of the resonators, the material influencing the strength of the capacitive coupling between the inner conductors of the two, usually adjacent, resonance circuits.

By making capacitive couplings, i.e. by controlling them, it is possible to make the filter work in a desired manner, which in turn allows the entity formed by several resonance circuits to be made to implement a desired frequency response, such as a pass band in a band-pass filter, the filter allowing the signals within the band to pass through. The pass band may be for example a 25-Mhz frequency band of a GSM base station employing the TDMA technique, the bandwidth being within the frequency range from 925 to 960 MHz, which is the range where single 200-kHz wide GSM channels are located.

The couplings made in filters having ceramic, or otherwise dielectric, block-like housings, have conventionally been controlled by making grooves on the block, or what is known as the "stone"; in other words, the material of the block-like housing is removed from the side surfaces of the block. The grooved block is plated, the plating thus being narrower at the grooved portions, i.e. the outer conductor of the filter is narrower at the grooved portions in question. This type of solution is described in WO publication 83/02853. A problem with this solution is the extra work arising from the cutting, because it complicates the manufacturing process. A particular problem is that for different kinds of applications, differently shaped blocks are required.

Another way to control the couplings in filters having block-like housings made of a ceramic or other kind of dielectric material has been to form conductive patterns on a surface of the block-like housing, the patterns having an effect on the capacitive and/or inductive couplings of the resonance circuits. A solution of this type is described in EP publication 694983. A drawback of this solution is that the manufacturing processes involved become more complicated when the conductive patterns are made onto the side surface of the block-like housing.

A third method is the structure known from Fl publication 87406 in which one of the four side surfaces of the block-like housing is left unplated, and the resonator couplings are influenced by means of a connection base arranged against the unplated side of the block, the connection base surface between the unplated side and the connection base being provided with conductive patterns that allow capacitive couplings to the inner conductors and connections between the inner conductors to be made. This solution requires, however, a plane arranged on the other side of the connection base to serve as ground potential which in a way replaces the plating that has been left out of the fourth side surface. The circuit board and the conductive pattern thus become in a way an integral, operational part of the filter structure, thereby producing a non-homogenous structure because the structure is covered by different kinds of conductive materials, such as a ceramic block and a circuit board provided with a conductive pattern. The problem is further emphasized if the dielectric block and the circuit board have different dielectricity constants, because the electromagnetic field of materials having differing dielectricity constants will behave differently. Another at least equally serious problem is the alignment of the block and the connection base, or the circuit board, because any inaccuracies in the positioning of the block with regard to the circuit board will cause a corresponding inaccuracy in the positioning of the conductive pattern on the circuit board with regard to the inner conductors of the filter. A further problem is that there will be variation in the shape of the conductively covered inner space of the filter structure, defined by the three block surfaces and the conductive plating arranged on the opposite side of the circuit board, if the positioning is not as designed. Moreover, problems may arise from how to make the clearance between the unplated surface of the block arranged against the connection base as small as possible. The paste, glue or other attaching agent used for joining the unplated block side to the connection base must be very carefully dosed, and the drying and other processing of the glue, or the like, must be extremely well controlled to ensure that in mass production the process is always repeated in the same way.

BRIEF DESCRIPTION OF THE INVENTION

It is therefore an object of the present invention to provide a novel filter which allows the problems and drawbacks of the prior art solutions to be avoided.

To achieve the above object, the filter of the invention is characterized in that the filter, which is connected to the conductive pattern of the connection base, the connection base being outside the conductive plating acting as the filter's outer conductor and arranged on the surface of its block-like housing, comprises one or more coupling members for making capacitive couplings between the inner conductors.

The invention is based on the idea of arranging the coupling members on the connection base outside the plated block.

An advantage of the filter structure of the invention is that the coupling members, particularly the members for making capacitive couplings, are arranged on the connection base which is outside the filter's outer conductor and on which the block-like housing having a side surface plated with an outer conductor plating is arranged. This allows the invention to be implemented using an extremely simple block where all side surfaces are plated, i.e. also the surface facing the circuit board, the circuit board thus not forming a structural part that would affect the operation of electric fields and/or magnetic fields. The same applies to the coupling members arranged onto the circuit board; they do not affect the operation of the electric and/or magnetic fields either because, similarly to the circuit board, i.e. the connection base, they are also outside the filter's outer conductor.

BRIEF DESCRIPTION OF THE DRAWINGS

In the following the invention will be described in greater detail in connection with preferred embodiments and with reference to the accompanying drawings, in which.

DETAILED DESCRIPTION OF THE INVENTION

Figure 1A:
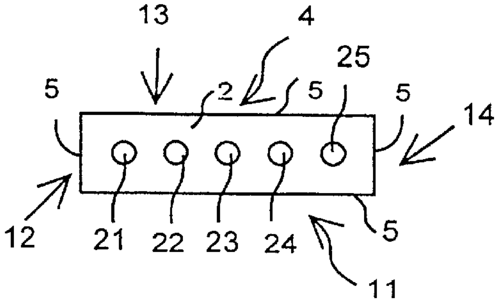
FIG. 1*a* shows a ceramic block provided with outer conductor plating and plated holes, seen from the direction of the holes.
Figure 1B:
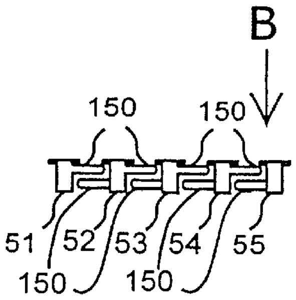
FIG. 1*b* shows five galvanic coupling portions, each provided with members for making capacitive couplings.
Figure 1C:
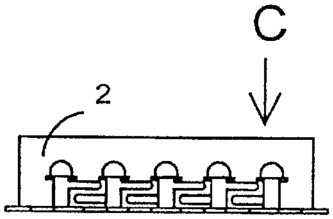
FIG. 1*c* shows the structure of FIG. 1*b* arranged into the plated holes of FIG. 1*a*.

With reference to all the above Figures, the filter in question is a high-frequency filter 1, particularly an RF filter 1. The filter 1 comprises a block-like housing 2 made of a dielectric material, the housing comprising ends 34 and side surfaces 11–14. On the side surfaces between the ends 3–4 of the housing 2, the filter comprises a conductive plating 5 acting as the filter's outer conductor, which is most preferably at ground potential. The filter further comprises at least two holes plated with a conductive material, the holes extending on the portion between the ends 3–4 of the block-like housing to allow at least two inner conductors 21–25 to be provided. As will be stated at the end of the specification, in a quarter wave version, also the end 4 is provided with a conductive plating, or a similar connection connecting one end of the inner conductors 21–25 to the outer conductor 5. The Figures show an example with five conductively plated holes as the inner conductors 21–25, but their number may vary, depending on how many resonance circuits will be used to form the filter's frequency response. Together with the outer conductor 5, each inner conductor 21–25 forms a resonance circuit, the example of the FIG. thus showing a 5-circuit filter. The plated holes 21–25, i.e. the inner conductors 21–25, thus extend either from end 3 to end 4, or only part of the way. In other words, the holes do not need to be through holes, although the Applicant has discovered that they provide the best version.

The inner conductors are most preferably of an equal length and preferably parallel, to allow a simple structure to be provided.

Figure 2A:
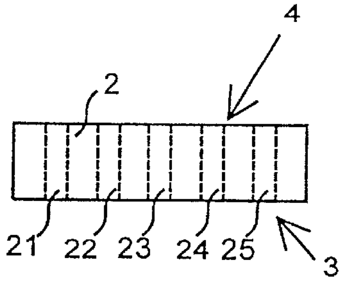
FIG. 2*a* shows the dielectric housing of FIG. 1*a*, seen from the direction of the plated side surface.
Figure 2B:
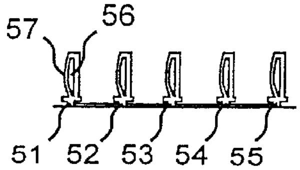
FIG. 2*b* shows the galvanic coupling portions of FIG. 1*b*, seen from the direction of arrow B in FIG. 1*b*.
Figure 2C:
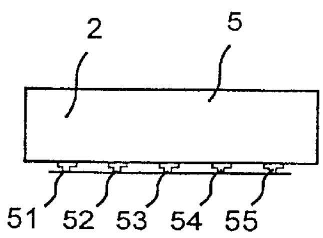
FIG. 2*c* shows the structure of FIG. 1*c*, seen from the direction of arrow C in FIG. 1*c*.
Figure 2D:
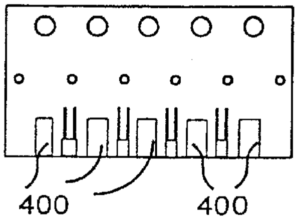
FIG. 2*d* shows the adjustment cover of FIG. 1*d*, seen from the direction of arrow G in FIG. 1*d*.

Moreover, the filter comprises a connection base 31 provided with a conductive pattern 30, the plated block-like housing 2 being arranged onto the base. The connection base is most preferably a circuit board, provided with the conductive pattern 30 arranged onto a base made of an insulating material. The conductive pattern 30 comprises connecting areas 41–45 for connecting the inner conductors 21–25 to the conductive pattern 30 on the connection base 31. To allow the inner conductors 21–25 to be connected to the connecting areas arranged on the connection base, the filter is so designed that the inner conductors of filter's block-like housing are connected to the connection areas provided for the inner conductors said areas being arranged on the conductive pattern of the connection base at the end 3 of the block-like housing 2 by means of galvanic connectors 51–55. The galvanic connectors 51–55, which are shown particularly in FIGS. 1*b*, 2*b*, 3*b* and 4*b*, are made of thin, strip-like metal plates of 0.4 mm, for example, or similar metal plates. A first end of the galvanic connector 51, for example, is soldered to and/or pressed against the inner conductor 21 which is, as stated, the hole 21 provided with a conductive plating. With reference to FIG. 2*b* in particular, it is stated that to provide a compression joint, the galvanic connector, such as the galvanic connector 51, comprises an at least slightly spring-like structure 56–57, the structure shown in FIG. 2*b* being implemented by means of a slit 56 arranged to the galvanic connector 51 and an edge portion 57 arranged after the slit 56 to the galvanic connector 51, the side portion being most preferably curved to provide compression between the galvanic connector and the plated hole 21. The other galvanic connectors 52–55 are similar to the galvanic connector 51.

An essential aspect of the invention is that the filter, which is arranged on the connection base 31 outside the conductive plating acting as the outer conductor 5 of the filter and is connected to the conductive pattern on the connection base 31, comprises one or more coupling members 110, 120, 130, 140, 150 for the capacitive coupling of the inner couplers. The numbering used here refers to five main types of coupling members, the types being described in greater detail later.

Figure 3A:
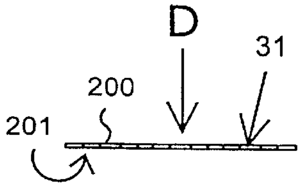
FIG. 3*a* shows a connection base provided with conductive plating.
Figure 3B:
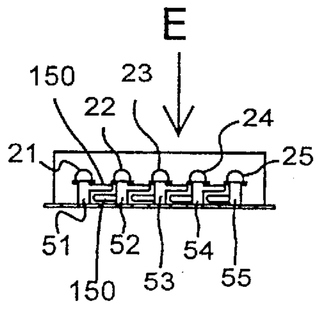
FIG. 3*b* shows the structure of the FIGS. 1*c* and 2*c* arranged onto the connection base of FIG. 3*a*.
Figure 4A:
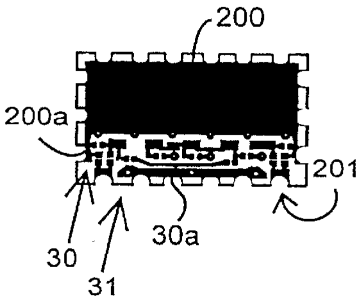
FIG. 4*a* shows the connection base of FIG. 3*a* provided with a conductive pattern, the base being seen from the direction of arrow D in FIG. 3*a*.
Figure 4B:
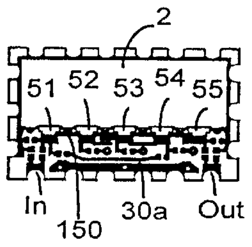
FIG. 4*b* shows the structure of FIG. 3*b*, seen from the direction of arrow E in FIG. 3*b*.
Figure 5:
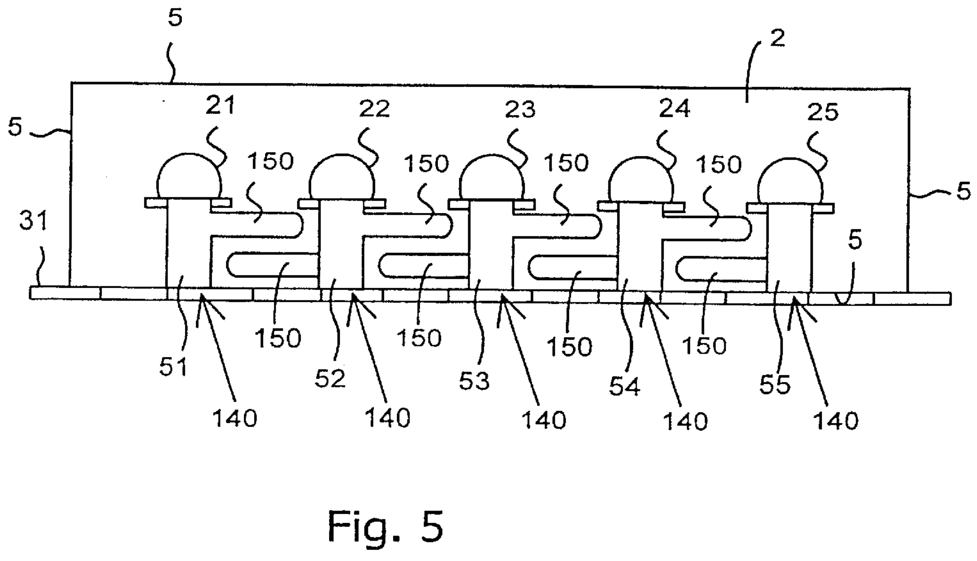
FIG. 5 shows an enlargement of the structure of FIG. 3*b*.
Figure 6:
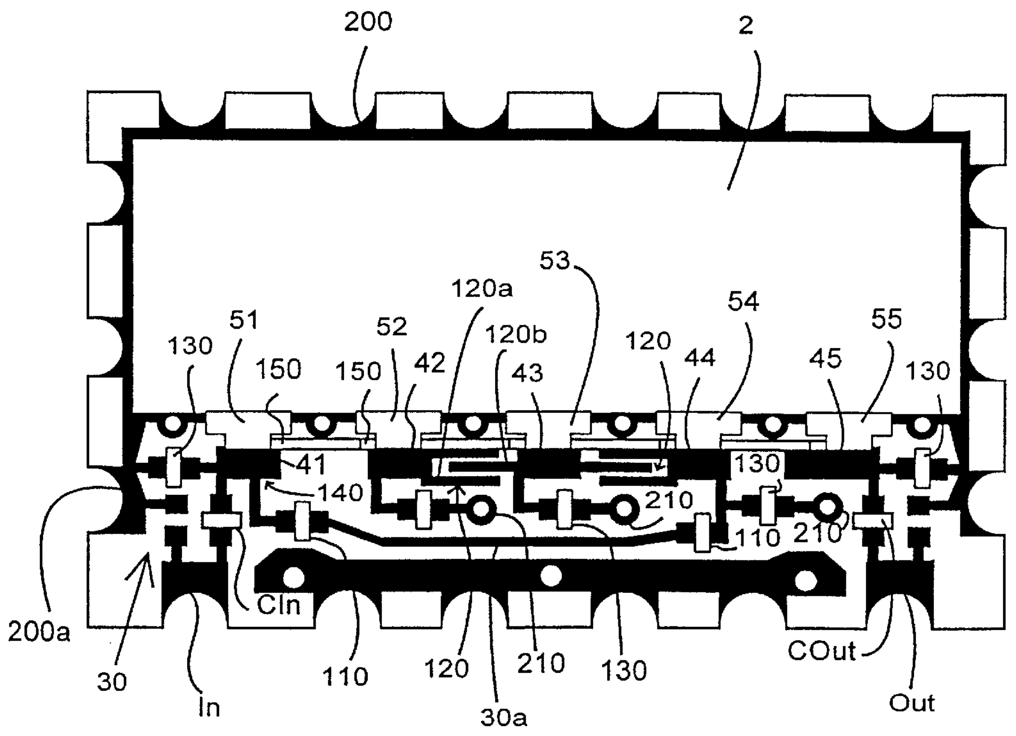
FIG. 6 shows an enlargement of the structure of FIG. 4*b*, together with the coupling members formed on the circuit board.
Figure 7:
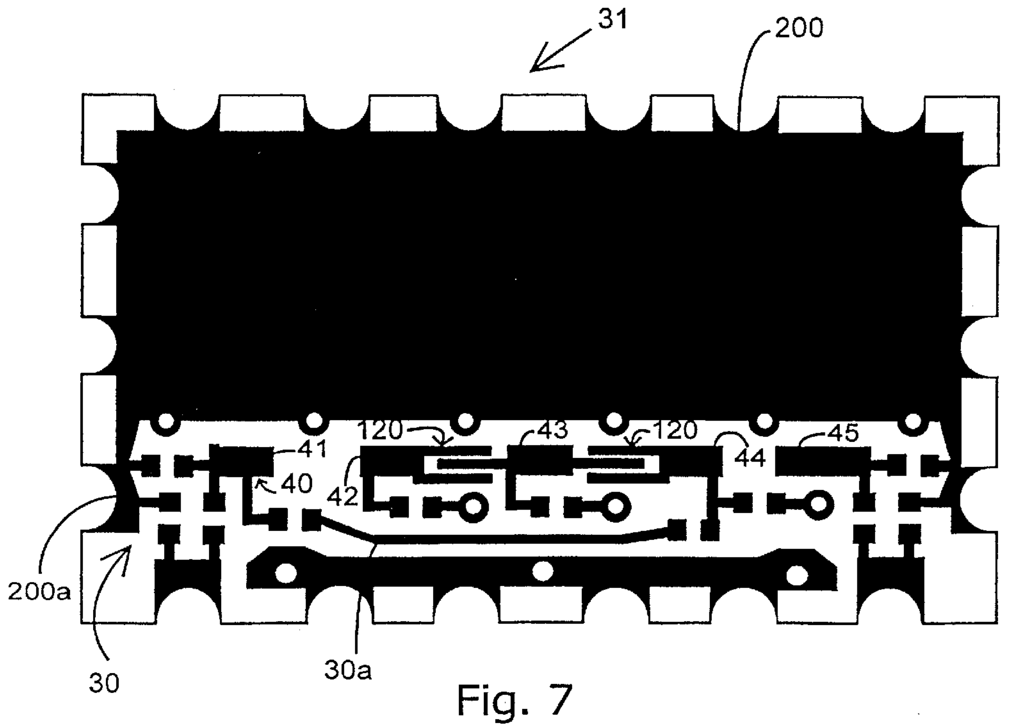
FIG. 7 shows an enlargement of the structure of FIG. 4*a*.

FIGS. 3*b* and 4*b*, in particular, show a preferred embodiment of the filter where the connection base 31, which is provided with one or more members 110, 120, 130, 140, 150 for making capacitive couplings, comprises a conductive area 200 serving as the ground potential plane, the conductive outer conductor plating 5 of the block-like housing 2 being arranged against the conductive area, i.e. a side 11 of the conductively plated outer surface of the block is against the area 200, which is at the ground potential. This provides a structure where the ground potential plane 200 arranged at the connection base provided with one or more members for making capacitive couplings forms a part of the conductive pattern 30 of the connection base 31, the plane being, however, galvanically isolated from the connection areas 41–45 of the inner conductors belonging to the conductive pattern 30. With reference to FIG. 4*a*, it is stated that the area at the ground potential preferably extends also to the other side of the connection base 31, the other side being indicated in FIG. 3*a* with reference numeral 201. In FIGS. 4*a*, 5, and 7, plated grooves 200*a*, or the like, at the edge of the connection base 31 connect the ground potential area 200 to the ground potential area 201 on the other side of the connection base 31.

As shown by FIG. 7 in particular and, to some extent, also by FIGS. 3*b* and 4*b*, the one or more members 110, 120, 130, 140, 150 for making capacitive couplings are arranged on the connection base 31 outside the projection between the block-like housing 2 and the connection base 31. In other words, the coupling members are literally on the connection base 31, such as the capacitor-type type coupling members 110, 120, 130,140, or the coupling members are provided as protruding coupling members 150, or the like, for bendable adjusting as used for end-tuning of the filter, and they are arranged at the galvanic connectors 51–55 extending from the connection areas 41–45 of the inner conductors of the connection base 31. On the other hand, the coupling members 110, 120, 130, 140, 150 can also be divided into two groups according to whether the coupling member concerned is used for making capacitive couplings between the inner conductors 21–25, such as the coupling members 110, 120, 150, or for making capacitive couplings between the inner conductors 21–25 and the ground potential plane 200, 201, or a similar reference plane, such as the coupling members 130, 140.

In the following, the above-mentioned coupling members 110, 120, 130, 140, 150 for making capacitive couplings will be discussed in greater detail.

With a particular reference to FIG. 7 and reference numerals 110 and 120, it is stated that the filter, which is connected to the conductive pattern 30 of the connection base 31, comprises one or more coupling members 110, 120 on the connection base 30 for making capacitive couplings between the inner conductors 51–55. Reference numeral 110 particularly indicates that the one or more coupling members 110 for making capacitive couplings between the inner conductors, such as the inner conductors 21 and 24, comprise a capacitor 110 connected to the connection areas 41, 44 of the inner conductors on the connection base 31. In other words, the one or more coupling members 110, represented by the capacitor/s 110, are used for influencing the strength of the capacitive coupling between the inner conductors 21, 24. FIG. 7 shows two coupling members 110 connected in series by a conductive pattern section 30*a*. The coupling member 110 is for example what is known as a chip capacitor. The inner conductor 21 is coupled, through the galvanic connector 51, to the connection area 41 of the inner conductor 21 belonging to the conductive pattern 30 of the connection base 31, the connection area 41 being in turn coupled to the connection area 44 of the inner conductor 24 by the capacitor 110, the conductive pattern section 30*a* and the second capacitor 110, the connection area 44 being in turn coupled to the inner conductor 24 by the galvanic connector 54. The value of the capacitors 110 between the inner conductors 21 and 24, in other words, between the connection areas 41, 44 of the inner conductors 21, 24 may be for example 0.5 pF, two capacitors 110 connected in series thereby producing a capacitor value of 0.25 pF.

Figure 8:
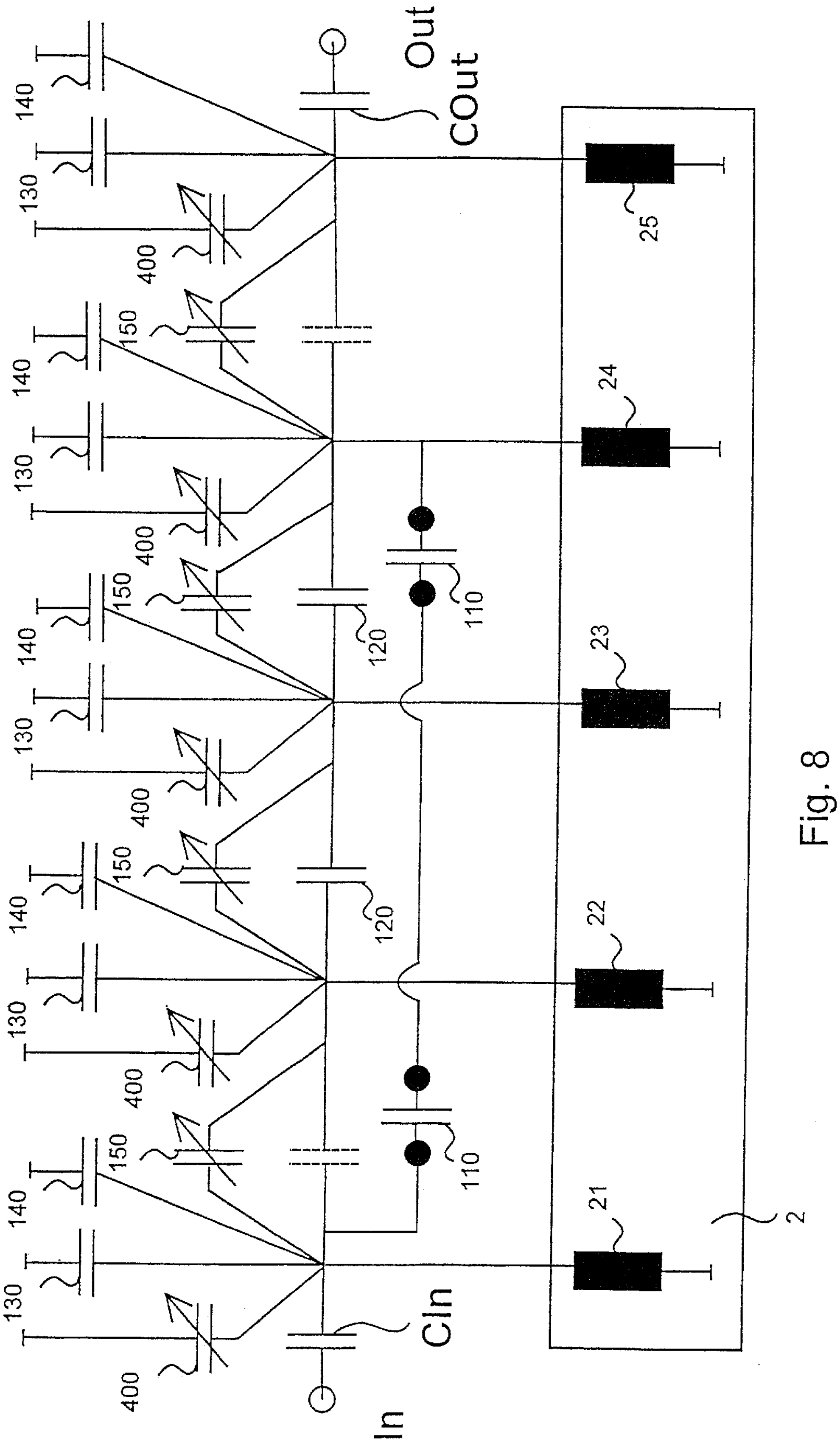
FIG. 8 illustrates a switching diagram which shows how different coupling members are arranged at resonance circuits.

The coupling members 120 will be discussed next, and with reference to these, and particularly to FIG. 7, it is stated that the one or more coupling members 120 for making capacitive couplings between the inner conductors, such as the inner conductors 22 and 23 and also the inner conductors 23 and 24, comprise a capacitive coupling member 120 which is connected to the connection areas 42, 43 of the inner conductors 22, 23 on the connection base 31 and, correspondingly, to the connecting areas 43, 44 of the inner conductors 23, 24, the electrodes of the capacitive member being conductive areas 120*a*, 120*b* formed on the connection base 31 and connected to the connection areas 43, 44 of the inner conductors 23, 24. The most preferred capacitive coupling members 120 are what are known as finger capacitance elements, the electrodes of which are interlaced, or at least adjacent to each other. The value of a finger capacitance element may be of the order of 0.5 pF. FIG. 8 shows two capacitors drawn in broken lines, their location corresponding to those of the capacitive coupling members 120; these capacitors are optional and they are not included in FIG. 7.

The coupling members 120 of the finger capacitance type may be replaced by the above described chip capacitors 110, and vice versa.

In FIGS. 7–8 the input of the filter is shown by In, and the output by Out. An input signal is connected to the first resonance circuit at the connecting section 41 of the inner conductor 21 using for example a capacitor C In, an output signal being received from the last, i.e. fifth, resonance circuit after the capacitor C Out.

The coupling members 150 will be discussed next, the coupling members providing a third coupling member type, in addition to the two types mentioned above, having an effect on the strength of the capacitive coupling between the inner conductors 21–25. The coupling members 150 differ from the other coupling members 110, 120, 130, 140 both with regard to their principle and their use, because the coupling members 150 are not capacitors lying on the connection base, like the coupling members 110, 130, nor connection base platings acting as capacitive members, such as finger capacitance coupling members 120, but the coupling members 150 are formed on the galvanic connectors 51–55 arranged between the connection areas 41–45 on the connection base 31 and the inner conductors 21–25 of block 2. The one or more coupling members 150 for the capacitive couplings between the inner conductors comprise an adjusting coupling member 150 comprising a galvanic coupling portion, such as 51–55, the adjusting member being most preferably a bendable projection, or a similar whisker. The coupling members 150 differ from the other coupling members in that the coupling members 150 may be bent, for example, when a frequency band is to be adjusted or tuned to a desired form.

The three coupling member types 110, 120, 150 described above relate to capacitive couplings made between the inner conductors 21–25.

Next, the two coupling member types 130, 140 will be discussed, these types being used for setting the strength of the capacitive coupling between the inner conductor and the ground potential, or a similar reference potential. The filter therefore comprises one or more coupling members 130, 140, the coupling members 130, 140 being arranged on the connection base 31 and coupled to the conductive pattern 30 of the connection base 31, for making capacitive couplings between the inner conductor and the ground potential, or a similar reference potential.

With reference to the coupling members 130 it is stated that the one or more coupling members 130 for capacitive couplings between the inner conductors 21–25 and the ground potential, or a similar reference potential 201, comprise a capacitor 130, such as a chip capacitor, located on the connection base 31 and arranged between a conductive area connected to the connection area 42 of an inner conductor, such as the inner conductor 22, and a conductive area connected to the ground potential 201. In the preferred embodiment, the connection through the connection base 31 to the ground potential plane 201, or a similar reference plane, is provided by means of a hole, or other connection, metallized through the base. The value of the capacitor 130 may be of the order of 0.5 pF. The outermost capacitors 130 in FIGS. 7–8, i.e. the left-most and the right-most ones, are optional and they differ from the three capacitors 130 in the middle in that the outermost capacitors are not connected to the ground potential 201 through the connection base 31, but the outermost capacitors are connected to the ground potential 201 through grooves 200*a* of the ground potential 200.

As stated above in connection with the coupling member 120, finger capacitance may be used instead of the capacitor 130 and the chip capacitor 130.

The coupling members 130 are most preferably connected to the ground potential, or a similar reference potential 201, through the conductive area arranged at the ground potential, or a similar reference potential, and acting as a second coupling point for the coupling member capacitor 130 between the inner conductor and the ground potential 201, the conductive area being connected to the ground potential through a conductive connection 201, such as a through metallized connection 210, formed through the connection base 31. An alternative connection base is a multi-layer circuit board structure (not shown), in which case the coupling member 130 would be connected to a reference potential area arranged inside the connection base and having a conductive coupling to the ground potential area 201, or a similar reference potential area, arranged on the other side of the connection base 31. In other words, there would be no through metallized hole 210 on the connection base 31.

The fifth type of coupling member 140 is represented by a capacitance element generated, entirely or partially, through the connection base 31. The capacitive coupling members 140 are arranged between each connection area 41–45 and, on the other hand, each reference potential plane 201. The Figures show an example where the capacitance element 140 extends through the entire connection base 31. In the Figures, the first electrodes of the capacitive coupling members 140 are represented by the connection areas 41–45 and branches, or similar areas, connected to them, the second electrode being represented by the ground potential plane 201, or a similar reference potential plane 201, arranged on the other side of the connection base 31. But as already stated in connection with the coupling member 130, the connection base of the coupling member 140 may also be a multilayer structure (not shown), in which case the second electrode of the capacitive coupling member 140 would be inside the connection base 31, at reference potential, which would not, however, be the ground potential yet, the second electrode in question, i.e. the electrode inside the connection base 31, having a capacitive (or other) coupling to the ground potential 201, or a similar reference potential, arranged on the other side of the connection base. However, the most preferred filter is one where the reference potential section 201 is the ground potential section, which is most preferably located, as stated, on the other side of the connection base 31, i.e. not on the same side with the connection areas 41–45 of the inner conductors 21–25. However, it is not to be forgotten that ground potential is also represented by the ground potential area 200, which is on the same side as the connection areas 41–45. The value of the capacitance obtained using the capacitive coupling member 140 extending entirely or partially through the connection base 31 is of the order of 1 pF.

The Figures show a quarter-wave version (Lambda/2), the other end of each inner conductor 21–25 being at the ground potential 200, i.e. connected to the outer conductor 5, because in this version, there is a conductive plating at the other end 4 of the block-like housing 2 which belongs the same plating entity 5 as the plating 5 on the sides 11–14 of the block 2, i.e. the plating on the second block end 4 joins the second ends of the inner conductors 21–25, i.e. the middle conductors 21–25, or resonators 21–25, to the plating 5 on the sides 11–15.

Another possibility would be a half-wave version (Lambda/2) in which both ends of the inner conductors are free from the connection to the ground potential, and thereby free from the connection to the outer conductor.

Figure 1D:
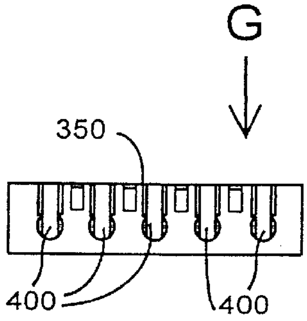
FIG. 1*d* shows an adjustment cover provided with adjusting members.
Figure 3C:
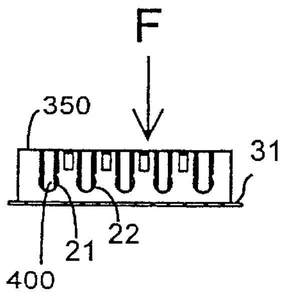
FIG. 3*c* shows the structure of FIG. 3*b* provided with the adjustment cover.
Figure 4C:
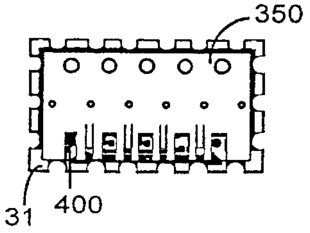
FIG. 4*c* shows the structure of FIG. 3*c*, seen from the direction of arrow F of FIG. 3*c*.

Finally, let us discuss the adjustment cover 350 shown in FIGS. 1*d,* 2*d,* 3*c* and 4*c,* the cover comprising bendable or otherwise adjustable adjusting members 400, also shown in FIG. 8. The adjustment cover 350 comprises a desired number of the adjusting members 400, for example one for each resonance circuit. In the quarter-wave version the adjusting members 400 are bent near to the "free", i.e. not closed, or not short-circuited, end of the inner conductors 21–25, i.e. the resonators. In the Figures the adjusting members 400 are bent approximately 90 degrees down toward the connection base. The adjusting member cover 350 is soldered or otherwise connected to the ground potential 200. In the half-wave version, the adjustment cover and its adjusting members would be turned 180 degrees compared with FIGS. 3*c* and 4*c,* i.e. the adjusting members of the adjustment cover would be facing different inner conductor ends as in the quarter-wave version shown in the Figures.

It is apparent to a person skilled in the art that as technology advances, the basic idea of the invention can be implemented in various ways. The invention and its embodiments are therefore not restricted to the above-described examples but they may vary within the scope of the claims.

What is claimed is:

1. A high-frequency filter comprising:

a block-like housing (2) made of a dielectric material, the housing comprising ends (3, 4) and side surfaces (11–14), the section formed on the side surfaces between the ends being provided with a conductive plating acting as the filter's outer conductor (5);

at least two holes plated with a conductive material and extending between the ends of the block-like housing to allow at least two inner conductors (21–25) to be provided;

a connection base provided with a conductive pattern (30), the block-like housing being arranged onto the base; and a conductive pattern (30) of the filter comprising connection areas (41–45) for coupling the inner conductors (21–25) to the connection base (30), wherein the filter, which is connected to the conductive pattern (30) of the connection base (31), the connection base (31) being outside the conductive plating acting as the filter's outer conductor (5) and arranged on the surface of its block-like housing (2), comprises one or more coupling members (110, 120, 130,140, 150) for making capacitive couplings between the inner conductors.

2. A filter according to claim 1, wherein the connection base (31) provided with the one or more coupling members (110, 120, 130, 140, 150) for capacitive couplings comprises a conductive section (200) acting as the ground potential plane, the conductive outer conductor plating of the block-like housing being arranged against the section.

3. A filter according to claim 2, wherein the ground potential plane (200, 201) on the connection base (31) provided with one or more coupling members (110, 120, 130, 140, 150) for capacitive couplings forms a part of the conductive pattern of the connection base, the plane being, however, galvanically isolated from the connection areas (41–45) of the inner conductors belonging to the conductive pattern (30).

4. A filter according to claim 1, wherein the filter's coupling members (110, 120, 130, 140, 150) for making capacitive couplings are located on the connection base (31) at least primarily outside the projection between the block-like housing (2) and the connection base (31).

5. A filter according to claim 1, wherein the filter comprises one or more coupling members (110, 120, 150) for capacitive couplings, the coupling members being arranged on the connection base and coupled to the conductive pattern of the connection base, for making capacitive couplings between the inner conductors (21–25).

6. A filter according to claim 5, wherein the one or more coupling members (110) for making capacitive couplings between the inner conductors comprise a capacitor (110) connected to the connection areas of the inner conductors on the connection base (31).

7. A filter according to claim 5, wherein the one or more coupling members (120) for making capacitive couplings between the inner conductors comprise a capacitive member (120) connected to the connection areas of the inner conductors (21–25) on the connection base (31), the conductive sections formed on the connection base and connected to the connection areas (41–45) of the inner conductors providing the electrodes of the member.

8. A filter according to claim 7, wherein the capacitive member (120) is a so-called finger capacitance element (120), the electrodes (120*a*, 120*b*) of which are interlaced.

9. A filter according to claim 1, wherein the inner conductors (21–25) of the block-like housing (2) are connected to the connection areas arranged for the inner conductors on the conductive pattern of the connection base by galvanic coupling means (51–55) at the end (3) of the block-like housing (2).

10. A filter according to claims 5 and 9, wherein the one or more coupling members (150) for the capacitive coupling between the inner conductors comprise an adjustment member comprising a galvanic coupling means (51–55).

11. A filter according to claim 1, wherein the coupling member (150) is a bendable projection on the coupling member (150).

12. A filter according to claim 1, wherein the filter comprises a reference potential section (200, 201) on the connection base (31), and that the filter comprises one or more coupling members (130, 140) for capacitive couplings, the coupling members (130, 140) being arranged on the connection base (31) and coupled to the conductive pattern (30) of the connection base (31), for making capacitive couplings between the inner conductor (21–25) and the reference potential section (200, 201).

13. A filter according to claim 12, wherein the one or more coupling members (130) providing the capacitive coupling between the inner conductor and the reference potential section (200, 201) comprise a capacitor arranged between the conductive section connected to the connection area (41–45) of the inner conductor (21–25) on the connection base (31) and the conductive section connected to the reference potential (200, 201).

14. A filter according to claim 13, wherein the capacitor coupling member (130) is connected to the reference potential section (201) through a conductive connection (210).

15. A filter according to claim 14, wherein the reference potential section (201) is on the other side of the connection base (31) than the connection areas (41–44) of the inner conductors, the conductive connection (210) being a through metallization penetrating the connection base (31), or some other conductive connection (210) penetrating the connection base.

16. A filter according to claim 12, wherein the one or more coupling members (140) for the capacitive coupling between the inner conductor (21–25) and the reference potential section (200, 201) comprise a capacitance element (140) that at least partially penetrates the connection base (31), and the first electrode of which is the connecting section (41–45), and the second electrode of which is the reference potential area (201) on the connection base.

17. A filter according to claim 12, wherein the reference potential area (201) is a ground potential area.

18. A filter according to claim 17, wherein the ground potential area (201) is on the other side of the connection base (31) than the connection areas (41–44) of the inner conductors.

19. A filter according to claim 9, wherein the one or more coupling members (150) for the capacitive coupling between the inner conductors comprise and adjustment member (150) comprising a galvanic coupling means (51–55).

* * * * *